Figure 1:
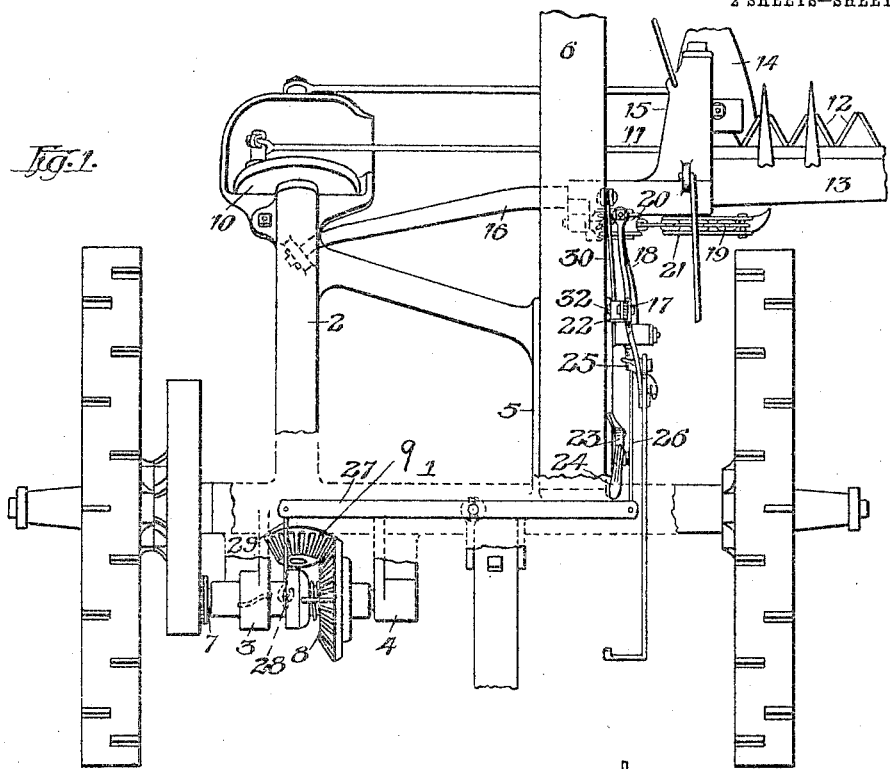

No. 802,751. PATENTED OCT. 24, 1905.
A. GRIEVES.
MOWING MACHINE.
APPLICATION FILED JULY 22, 1905.

2 SHEETS—SHEET 1.

Witnesses:
F. H. Alfreds
J. N. Daggett

Inventor:
Albert Grieves
By E. W. Burgess
Atty.

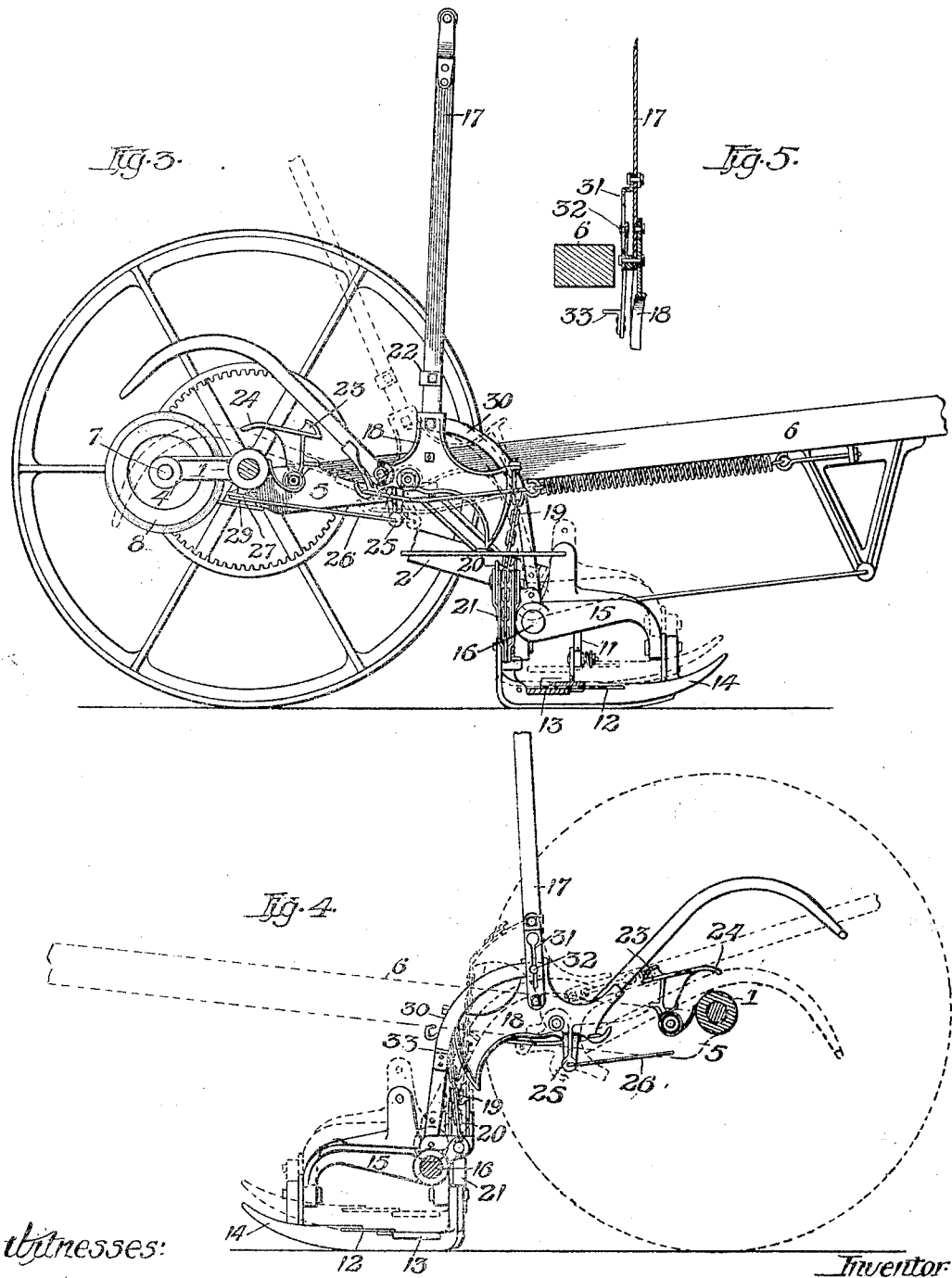

UNITED STATES PATENT OFFICE.

ALBERT GRIEVES, OF SPRINGFIELD, OHIO, ASSIGNOR TO INTERNATIONAL HARVESTER COMPANY, A CORPORATION OF NEW JERSEY.

MOWING-MACHINE.

No. 802,751.           Specification of Letters Patent.           Patented Oct. 24, 1905.

Application filed July 22, 1905. Serial No. 270,749.

*To all whom it may concern:*

Be it known that I, ALBERT GRIEVES, a citizen of the United States, residing at Springfield, in the county of Clark and State of Ohio, have invented certain new and useful Improvements in Mowing-Machines, of which the following is a specification, reference being had to the accompanying drawings, forming a part thereof.

My invention relates to mowing-machines, and particularly to the mechanism for adjusting the cutting mechanism to a higher or lower plane in that class of such machines wherein the cutter-bar is hinge-jointed to a coupling-frame which is pivotally connected with the main frame of the machine in a manner to rise and fall in following the inequalities of the surface of the ground and wherein the cutter-bar is designed to be adjusted from a horizontal or prostrate position to a substantially vertical one by means of a common form of hand-lever mounted upon the frame and connected with the coupling-frame and cutter-bar by flexible connections in any of the usual ways.

It consists in providing a supplemental connection between the hand-lever and the coupling-frame whereby the latter is sustained in an elevated position while the cutter-bar is moving from a vertical toward a horizontal position and then allowed to move to a lower plane with the cutter-bar. It is usual in the above type of machines to provide a connection between the hand-lever for adjusting the cutting apparatus and the clutch mechanism forming part of the power-transmitting means whereby the action of the latter is in part suspended when the cutter-bar has reached a degree of elevation rendering any further operation of the cutting mechanism impractical, and such connection being operated by the hand-lever it has been found that in lowering the cutter-bar to operative position by allowing the hand-lever to move forward that the cutter-bar was still left at an unsafe angle when the clutch mechanism was operatively engaged, the result being the locking of the gear mechanism and destruction of parts.

The object of my invention is to provide means whereby when the hand-lever is moved forward for the purpose of allowing the cutter-bar to move from a vertical toward a horizontal position and the clutch mechanism to engage operatively the coupling-frame is prevented from descending until the cutter-bar has assumed an angle making it safe to allow the cutting apparatus to be operatively connected with the power-transmitting mechanism. I attain this object by the mechanism illustrated in the accompanying drawings, in which—

Figure 2:
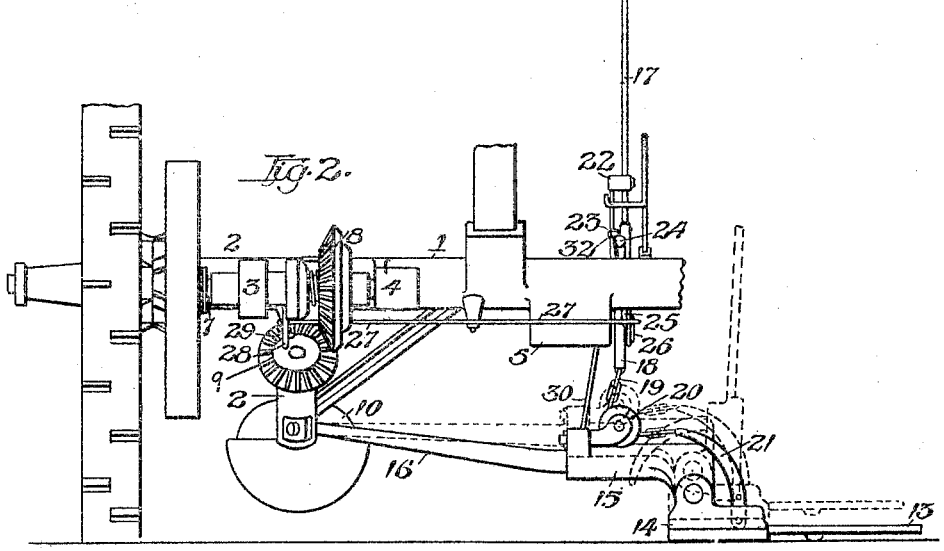

Figure 1 is a plan view of a part of a mowing-machine embodying my invention. Fig. 2 is a rear end elevation of a part of Fig. 1. Fig. 3 is a side elevation of part of Fig. 1. Fig. 4 is a view of part of Fig. 3 looking grassward, and Fig. 5 is a detached detail of part of the mechanism.

Similar numerals refer to similar parts throughout the several views.

1 represents the main frame member of the machine, having the forwardly-projecting tubular arm 2, the rearwardly-projecting arms 3 and 4, and the tongue-socket 5, in which the tongue 6 is secured. The main shaft is journaled in the main frame member 1 and is given motion in the usual way by means of the carrying-wheels, and 7 is the cross-shaft, journaled in the arms 3 and 4 and having the bevel-wheel 8 secured thereto, which meshes with the pinion 9, secured to the rear end of the crank-shaft that is journaled in the arm 2 and has the crank-wheel 10 secured to its forward end, and 11 is the pitman connecting the crank-wheel with the sickle 12, mounted on the cutter-bar 13, secured to the shoe 14, that is hinge-jointed with the coupling-yoke 15, that is pivotally mounted upon the coupling-bar 16, that is pivotally connected with the frame member 2.

Pivotally mounted upon the frame of the machine is a lifting-lever 17, having the forwardly-projecting sector-arm 18, to which is secured one end of a flexible member 19, that passes downward beneath a sheave 20, mounted upon the coupling-yoke 15, and then grassward toward the cutter-bar, to which it is connected by means of the inwardly-curved upstanding lever 21, pivotally mounted upon the shoe 14. The lifting-lever is provided with a clip 22, secured thereto and adapted to engage with a latch-piece 23, pivotally mounted on the frame, the purpose of which is to lock the lever in position when the cutting apparatus is raised to its highest limit, the latch-piece having a rearwardly-projecting heel-piece 24, designed to receive pressure from the operator's foot for the purpose of releasing the latch-piece from engagement with the clip. The lifting-lever is also provided with a rearwardly and downwardly projecting arm 25, to which is pivotally connected one end of a link 26, having its opposite end connected with one end of a vibratile-lever 27, mounted upon the lower side of the frame 1, and having its opposite end connected with the shipping-lever 28, forming part of the clutch mechanism, by means of the link 29, the clutch mechanism and associated parts being similar to that shown in Patent No. 767,359, dated August 9, 1904, granted to H. B. Sperry.

When the lifting-lever is moved rearward for the purpose of raising the cutter-bar to a vertical position, its initial movement does not affect the clutch mechanism; but as the movement is continued it causes the lever 27 to operate the shipping-lever in a manner to disengage the clutch mechanism when the cutter-bar has been raised to an angle making it impractical to operate the sickle.

In lowering the cutter-bar to operative position it is important that the clutch mechanism be retained in an inoperative position until the cutter-bar has reached an angle sufficiently obtuse relative to the pitman as to make it safe for the sickle to be given its reciprocating movement. In order to provide sufficient time for the above purpose, I provide means for retarding the downward movement of the shoe until the cutter-bar has assumed a substantially horizontal position, the means consisting in providing a link connection between the coupling-bar and lifting-lever that is independent of the flexible connection between said lever and the cutter-bar. The link 30 is pivotally connected at its lower end with the coupling-bar 16, and its rearwardly-curved upper end is pivotally connected with the lifting-lever at a point nearer the pivot of the latter than the connection of the flexible lifting member, by means of a slotted loop 31, engaging with a button 32, secured to the link. A step-bracket 33 is secured to the link and is adapted to contact with the tongue and limit the upward movement of the coupling-bar. When the lifting-lever is moved rearward, the flexible connection to the cutter-bar and coupling-bar lifts them upward in the usual manner, and the step-bracket 33, coming in contact with the tongue, arrests the movement of the coupling-bar and any further movement of the lever rearward operates to move the cutter-bar to a vertical position, the button 32 sliding downward in the slotted loop toward the pivotal axis of the lever. When the lifting-lever is moved forward to lower the bar, the arm 18, to which the flexible member 19 is connected, having a greater radius than the button connection between the link 30 and the loop 31, will allow the cutter-bar to move faster than the coupling-bar and reach a position substantially horizontal before the lifting-lever has moved far enough to allow the clutch mechanism to be operative to connect the power-transmitting mechanism with the cutting apparatus.

What I claim as being my invention, and desire to secure by Letters Patent, is—

1. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on the main frame and flexibly connected with said coupling-yoke and shoe, power-transmitting means comprising a clutch mechanism, a connection between said lifting-lever and said clutch mechanism whereby said clutch mechanism is rendered inoperative when said lifting-lever has reached a predetermined rearward position, and a connection between said lifting-lever and said coupling-yoke whereby the yoke is retained in an elevated position during a part of the forward movement of said lever.

2. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on said frame and flexibly connected with said coupling-yoke and shoe, power-transmitting means comprising a clutch mechanism, a connection between said lifting-lever and said clutch mechanism whereby said clutch mechanism is rendered inoperative when said lifting-lever has reached a predetermined rearward position, and a link having a sliding connection with said lifting-lever and pivotally connected with said coupling-yoke, whereby the yoke is retained in an elevated position during a part of the forward movement of said lever.

3. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on said frame and flexibly connected with said yoke and shoe, power-transmitting means comprising a clutch mechanism, a connection between said lifting-lever and said clutch mechanism whereby said clutch mechanism is rendered inoperative when said lifting-lever has reached a predetermined rearward position, and a link pivotally connected at its lower end with said coupling-yoke, a slotted loop secured to said lifting-lever, and a projecting button secured to the upper end of said link and engaging with said slotted loop.

4. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on said frame and flexibly connected with said yoke and shoe, power-transmitting means comprising a clutch mechanism, a connection between said clutch mechanism and said lifting-lever whereby said clutch mechanism is rendered inoperative when said lifting-lever has reached a predetermined rearward position, and a link having a sliding connection with said lifting-lever and pivotally connected with said coupling-yoke and having a step-bracket portion adapted to engage with the frame in a manner to limit the upward movement of the coupling-yoke.

5. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on said frame and flexibly connected with said yoke and shoe, power-transmitting means comprising a clutch mechanism, a connection between said clutch mechanism and said lifting-lever whereby said clutch mechanism is rendered inoperative when said lifting-lever has reached a predetermined rearward position, and a link having its lower end pivotally connected with said coupling-yoke, its upper end curved rearwardly and slidably connected with said lifting-lever, and a step-bracket secured thereto which is adapted to contact with said frame in a manner to limit an upward movement of said coupling-yoke.

6. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on the main frame and flexibly connected with said coupling-yoke and shoe, and a connection between said lifting-lever and said coupling-yoke whereby the yoke is retained in an elevated position during a part of the forward movement of said lever.

7. In a mowing-machine, the combination of a main frame, a rising and falling coupling-bar pivotally connected therewith, a coupling-yoke mounted on said coupling-bar, a shoe and cutter-bar pivotally mounted on said coupling-yoke, a lifting-lever pivotally mounted on said frame and flexibly connected with said coupling-yoke and shoe, and a link having a sliding connection with said lifting-lever and pivotally connected with said coupling-yoke, whereby the yoke is retained in an elevated position during a part of the forward movement of said lever.

In witness whereof I hereto affix my signature in presence of two witnesses.

ALBERT GRIEVES.

Witnesses:
  M. TULLIS,
  A. FOGARTY.